US011829522B1

(12) United States Patent
Jadidian et al.

(10) Patent No.: US 11,829,522 B1
(45) Date of Patent: Nov. 28, 2023

(54) HEAD MOUNTED DEVICE WITH SEGMENTED CHASSIS

(71) Applicant: Microsoft Technology Licensing, LLC, Redmond, WA (US)

(72) Inventors: Jouya Jadidian, Los Gatos, CA (US); Ruben Caballero, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/664,807

(22) Filed: May 24, 2022

(51) Int. Cl.
*G06F 3/01* (2006.01)
*H01Q 5/314* (2015.01)
*H01Q 1/27* (2006.01)

(52) U.S. Cl.
CPC .............. *G06F 3/012* (2013.01); *G06F 3/017* (2013.01); *H01Q 1/273* (2013.01); *H01Q 5/314* (2015.01)

(58) Field of Classification Search
CPC ......... G06F 3/012; G06F 3/017; H01Q 5/314; H01Q 1/273; H01Q 13/10; H01Q 1/243; H01Q 5/50; H01Q 9/42; H04B 1/0057; H04B 1/18; H03H 7/463; H03H 7/1758; H04L 5/1461
See application file for complete search history.

(56) References Cited

U.S. PATENT DOCUMENTS

| 5,012,206 A | 4/1991 | Tigges |
| 11,184,696 B1* | 11/2021 | Li ......................... H01Q 13/10 |

| 2009/0219039 A1 | 9/2009 | Fasshauer |
| 2010/0157858 A1* | 6/2010 | Lee ...................... H04B 1/0057 343/904 |
| 2011/0175789 A1* | 7/2011 | Lee ........................ H01Q 1/243 333/17.1 |

(Continued)

FOREIGN PATENT DOCUMENTS

| EP | 0998659 A1 | 5/2000 |
| WO | 2021173342 A1 | 9/2021 |
| WO | 2022055690 A1 | 3/2022 |

OTHER PUBLICATIONS

Alanis, et al., "3D Gesture Recognition Through RF Sensing", In Technical Report MSR-TR-2014-81, Jun. 2014, 14 Pages.

(Continued)

*Primary Examiner* — Richard J Hong
(74) *Attorney, Agent, or Firm* — Alleman Hall Creasman & Tuttle LLP (57) ABSTRACT

A head-mounted device (HMD) has a segmented metal chassis including a plurality of physically separate radio frequency (RF) antennas corresponding to different head regions. The HMD further includes a plurality of RF transceivers, each electrically connected to a corresponding RF antenna. Each RF transceiver is configured to drive the corresponding RF antenna with a drive signal at a frequency within a resonant frequency band of the corresponding RF antenna and sense a frequency response to the drive signal. The HMD further includes a plurality of notch filter circuits, each electrically connected in series with a corresponding RF antenna. Each notch filter is configured to attenuate signals at frequencies within the resonant frequency band of the corresponding RF antenna and pass signals at frequencies outside of the resonant frequency band, such that the segmented metal chassis functions as a common ground plane.

18 Claims, 5 Drawing Sheets

(56) References Cited

U.S. PATENT DOCUMENTS

| | | | | |
|---|---|---|---|---|
| 2011/0260939 | A1* | 10/2011 | Korva | H01Q 9/42 |
| | | | | 343/725 |
| 2013/0343440 | A1* | 12/2013 | Negus | H04L 5/1461 |
| | | | | 375/219 |
| 2014/0233441 | A1* | 8/2014 | Lee | H03H 7/463 |
| | | | | 370/297 |
| 2015/0091765 | A1* | 4/2015 | Frank | H01Q 1/273 |
| | | | | 343/718 |
| 2017/0063411 | A1* | 3/2017 | Ripley | H04B 1/18 |
| 2017/0133752 | A1* | 5/2017 | Choi | H01Q 5/50 |
| 2019/0212822 | A1 | 7/2019 | Keller et al. | |
| 2022/0069854 | A1* | 3/2022 | Jia | H03H 7/1758 |

OTHER PUBLICATIONS

"International Search Report and Written Opinion Issued in PCT Application No. PCT/US22/028879", dated Aug. 9, 2022, 14 Pages.

"International Search Report and Written Opinion Issued in PCT Application No. PCT/US23/013581", dated Jun. 23, 2023, 9 Pages.

\* cited by examiner

HEAD MOUNTED DEVICE WITH SEGMENTED CHASSIS

BACKGROUND

A head-mounted device (HMD) may include a plurality of radio frequency (RF) antennas to provide various communication and sensing functionality of the HMD. For example, RF antennas may be used for cellular, BLTE®, and Wi-Fi® communication. Further, RF antennas may be used for proximity sensing, such as for face and/or head tracking functionality.

SUMMARY

A head-mounted device (HMD) has a segmented metal chassis including a plurality of physically separate radio frequency (RF) antennas corresponding to different head regions. The HMD further includes a plurality of RF transceivers, each electrically connected to a corresponding RF antenna. Each RF transceiver is configured to drive the corresponding RF antenna with a drive signal at a frequency within a resonant frequency band of the corresponding RF antenna and sense a frequency response to the drive signal. The HMD further includes a plurality of notch filter circuits, each electrically connected in series with a corresponding RF antenna. Each notch filter is configured to attenuate signals at frequencies within the resonant frequency band of the corresponding RF antenna and pass signals at frequencies outside of the resonant frequency band, such that the segmented metal chassis functions as a common ground plane.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A head-mounted device (HMD) may include a plurality of radio frequency (RF) antennas to provide various communication and sensing functionality. In one example, an HMD employs a multi-band antenna configuration in which a centralized radio transceiver controls a plurality of different RF antennas. One drawback of the multi-band configuration is that it requires a plurality of active switches (e.g., multiplexer) to control switching between different frequency bands corresponding to the different antennas. The active switches consume electrical power that reduces power efficiency of the HMD. Further, the active switches increase a physical footprint and/or size of the centralized radio transceiver, which can negatively affect industrial design of the HMD. Further still, the active switches increase the overall cost and weight of the HMD.

Another drawback of the multi-band configuration is that, because all of the different antennas have different connections/traces that are routed to the same centralized radio transceiver in close proximity to one another and in close proximity to a ground reference, a shield amplifier (e.g., a voltage follower) typically is required to electrically isolate the different connections in order to inhibit signal crosstalk and other forms of interference. The active shield consumes electrical power that reduces power efficiency of the HMD. Further, the active shield increases a physical footprint and/or size of the centralized radio transceiver, which can negatively affect industrial design of the HMD. Further still, such an active shield may increase the overall cost and weight of the HMD.

The present description is directed to an HMD having a segmented metal chassis including a plurality of physically separate radio frequency (RF) antennas that are controlled by distributed radio transceivers. For example, the plurality of RF antennas may be configured to facilitate facial expression tracking functionality of the HMD. The RF antennas are distributed to different segments of the segmented metal chassis and correspond to different head regions in order to operate in the near-field regime to sense properties of the corresponding head region. The HMD further includes a plurality of notch filter circuits, each electrically connected in series with a corresponding RF antenna. Each notch filter circuit is configured to attenuate signals at frequencies within a resonant frequency band of the corresponding RF antenna and pass signals at frequencies outside of the resonant frequency band substantially unaltered. For example, various signals that are outside of the resonant frequency band that are passed through the notch filter circuits include, but are not limited to, cellular signals, WiFi® signals, and signals transmitted by other electronic components of the HMD, such as control signals transmitted from a controller to various electronic components (e.g., display, microphone, camera) of the HMD. In this way, the RF antennas have low impedance connectivity at frequencies outside the resonant frequency band that allows for the segmented metal chassis to function as a common ground plane.

The plurality of RF antennas of the segmented metal chassis collectively functioning as a common ground plane provides various benefits. As one example, the segmented metal chassis provides electrical continuity so that built-up charge can have a common return path through the segmented metal chassis to a ground reference. Such grounding prevents degradation of electronic components of the HMD due to overvoltage and increases electro-static discharge (ESD) robustness of the HMD. As another example, the segmented metal chassis has conductive properties that cause waves radiated by different RF antennas to be reflected thereby increasing radiation performance (e.g., increase signal to noise ratio (SNR)) relative to other HMD configurations.

Furthermore, the distributed design of the HMD allows for the omission of active switches because each of the plurality of RF antennas is controlled by a separate radio transceiver. In other words, the active switches are not needed because a centralized radio transceiver is not used to collectively control all of the RF antennas via multiplexing. Further, the distributed design of the HMD allows for the omission of an active shield because the each of the separate radio transceivers is positioned in close proximity to the corresponding RF antenna. In other words, the active shield is not needed because the connections of all of the RF antennas are not routed in proximity to each other to a centralized radio transceiver. By omitting the active switches and the active shield from the HMD, the HMD has increased power efficiency, reduced cost, reduced weight, and improved industrial design relative to an HMD that employs a multi-band antenna configuration that is controlled by a centralized radio transceiver as described above.

Figure 1:
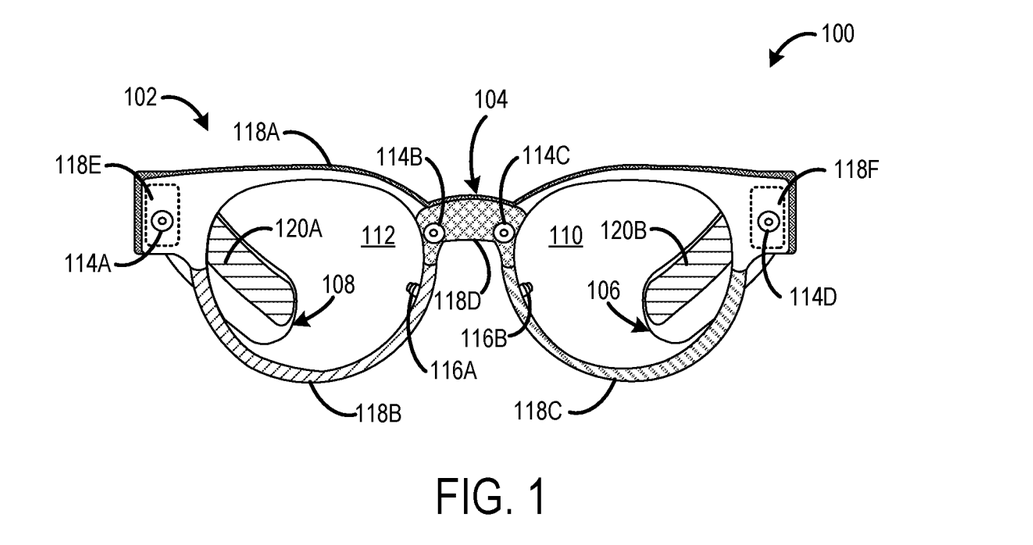
FIGS. 1-2 show an example head-mounted device (HMD).
Figure 2:
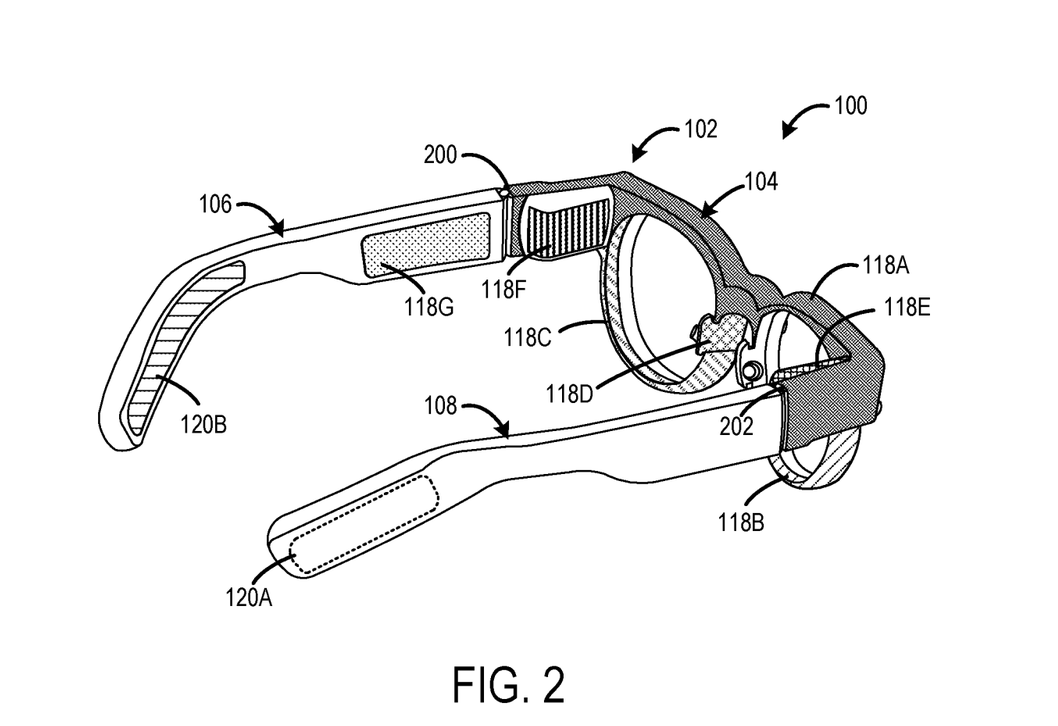

FIGS. 1-2 show an example HMD 100 including a segmented metal chassis 102. The HMD 100 is shown in simplified form. FIG. 1 is a front view of the HMD 100. FIG. 2 is a rear-perspective view of the HMD 100. The segmented metal chassis 102 provides structural support for various components of the HMD 100. The segmented metal chassis 102 includes a plurality of structural segments including a display frame segment 104, a left temple extension segment 106 and a right temple extension segment 108.

The display frame segment 104 is configured to rest on a user's nose. The display frame segment 104 is configured to physically support left and right near-eye displays 110, 112. The display frame segment 104 is further configured to physically support outward facing cameras 114A, 114B, 114C, 114D. The outward facing cameras 114A, 114B, 114C, 114D may facilitate various functionality of the HMD 100 including, but not limited to, pose determination, environment mapping, gesture recognition, and object recognition. The display frame segment 104 is further configured to physically support eye gaze cameras 116A, 116B that facilitate eye gaze tracking functionality of the HMD 100.

The left temple extension segment 106 couples to the display frame segment 104 via a left hinge 200 (shown in FIG. 2). The right temple extension segment 108 couples to the display frame segment 104 via a right hinge 202 (shown in FIG. 2). The left and right temple extension segments 106, 108 are configured to pivot about the left and right hinges 200, 202 between extended and folded positions. In the extended position, the left and right temple extension segments 106, 108 are configured to extend over a user's ears to retain the HMD 100 on the user's head. In the folded position, the left and right temple extension segments 106, 108 are configured to fold inward over each other to reduce an overall size of the HMD 100 for convenient storage of the HMD 100.

The left and right temple extension segments 106, 108 are configured to physically support various electronic components that facilitate operation of the HMD 100. For example, such electronic components may be contained within interior cavities of the left and right temple extension segments 106, 108. Such electronic components may include, but are not limited to, a controller, microphone(s), speaker(s), and sensor(s) (e.g., an inertial measurement unit (IMU)).

The HMD 100 is configured to provide facial expression tracking functionality. To this end, the segmented metal chassis 102 includes a plurality of physically separate RF antennas 118A, 118B, 118C, 118D, 118E, 118F, 118G corresponding to a plurality of head regions. In particular, an eyebrow RF antenna 118A corresponds to an eyebrow head region, a right cheek RF antenna 118B corresponds to a right cheek head region, a left cheek RF antenna 118C corresponds to a left cheek head region, a nose RF antenna 118D corresponds to a nose head region, a right temple RF antenna 118E corresponds to a right temple head region, a left temple RF antenna 118F corresponds to a left temple head region, and a jaw RF antenna 118G (shown in FIG. 2) corresponds to a jaw head region.

Each RF antenna of the plurality of RF antennas 118A, 118B, 118C, 118D, 118E, 118F, 118G comprises a metal piece that is configured to be driven with a drive signal to operate in the near-field regime to sense properties of a corresponding head region in close proximity to the RF antenna. Example properties that can be sensed by the RF antenna include distance, touch, and pressure/force. These properties may be determined based at least on an impedance of the RF antenna that is indicated by a sensed frequency response to the drive signal used to drive the RF antenna. Because these RF antennas 118A, 118B, 118C, 118D, 118E, 118F, 118G operate in the near-field regime in close proximity to the head regions, the RF antennas 118A, 118B, 118C, 118D, 118E, 118F, 118G need not be tuned with as much sensitivity as other antennas/radios of the HMD 100 (e.g., WiFi®, BTLE®). In the illustrated example, the plurality of RF antennas 118A, 118B, 118C, 118D, 118E, 118F, 118G are shown as being exposed on the surface of the HMD 100. In other examples, one or more of the plurality of RF antennas may be contained within a particular segment/enclosure/housing depending on the industrial design of the HMD, such that the RF antenna(s) are not exposed to an exterior surface.

As will be discussed in further detail below, the segmented metal chassis 102 additionally functions as a common ground plane for electronic components of the HMD 100. In particular, the segmented metal chassis 102 is electrically connected to a right and left common ground references 120A, 120B. The right common ground reference 120A is positioned within the right temple extension 108. The left common ground reference 120B is positioned within the left temple extension 106. Due to universal grounding of the segmented metal chassis 102, the RF antennas 118A, 118B, 118C, 118D, 118E, 118F, 118G (as well as other antennas (e.g., cellular, WiFi®) may have increased SNR (e.g., 10-100 times greater SNR) relative to other configurations, such as a configuration that employs glass antennas.

The segmented metal chassis 102 may comprise any suitable metal or metal alloy. In one example, the segmented metal chassis 102 comprises aluminum. In other examples, the segmented metal chassis 102 may comprise another type of metal or metal alloy. In some examples, parts of the segmented metal chassis 102 may be coupled with other parts comprising other materials. For example, the temple extension segments may be at least partially encased in plastic parts and/or rubber parts that may facilitate a more comfortable fit of the HMD on a user's head.

The HMD 100 is provided as a non-limiting example. An HMD including a segmented metal chassis as described herein may take any suitable form. The segmented metal chassis may include any suitable number of RF antennas corresponding to any suitable number of head regions.

Figure 3:
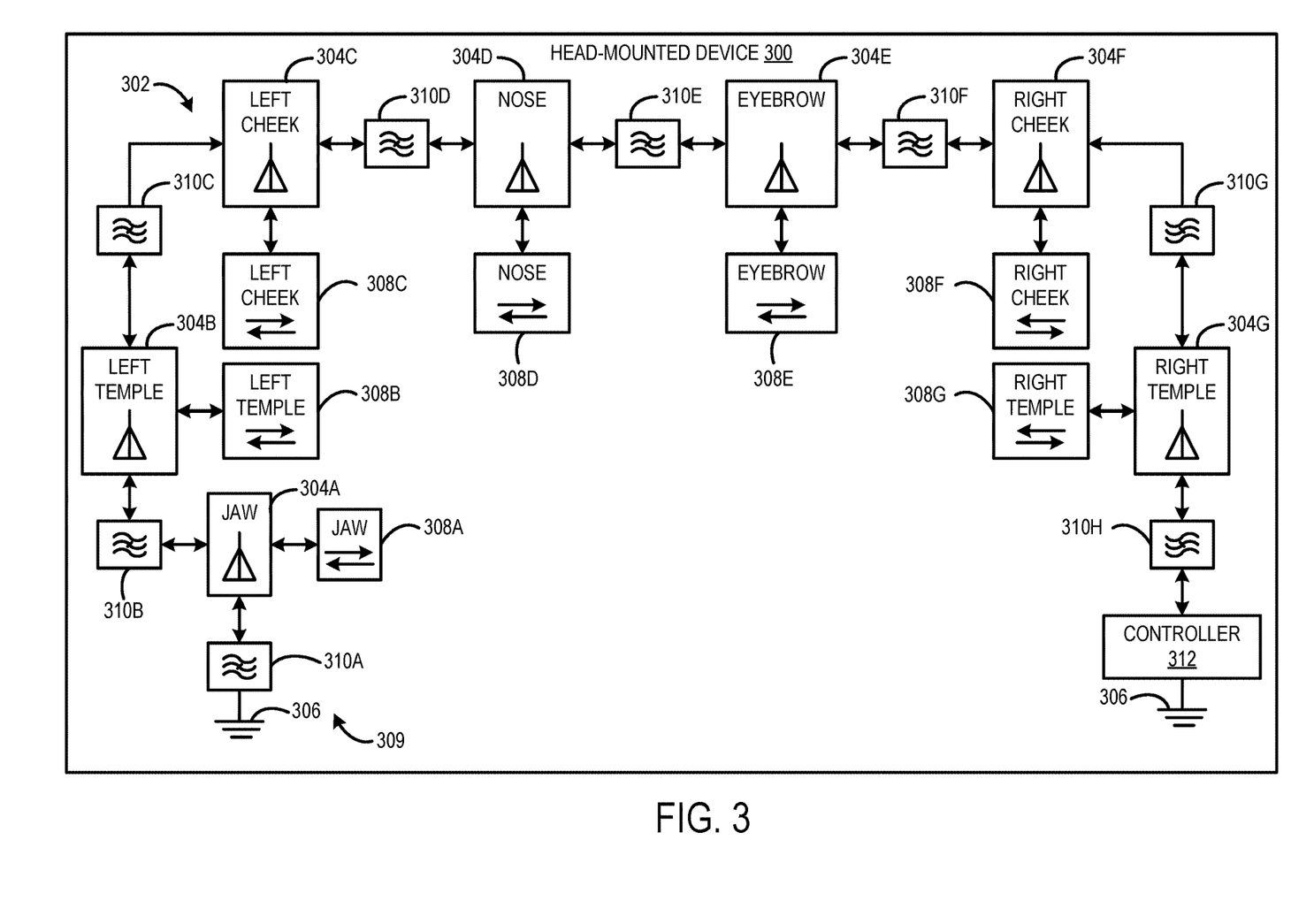
FIG. 3 shows a system block diagram of an example HMD.

FIG. 3 shows a system block diagram of an example HMD 300. For example, the HMD 300 may correspond to the HMD 100 shown in FIGS. 1-2. The HMD 300 includes a segmented metal chassis 302 including a plurality of physically separate RF antennas 304A, 304B, 304C, 304D, 304E, 304F, 304G corresponding to a plurality of head regions. The segmented metal chassis 302 is electrically connected to a ground reference 306. Further, the segmented metal chassis 302 including the plurality of physically separate RF antennas 304A, 304B, 304C, 304D, 304E, 304F, 304G collectively function as a common ground plane 309 for electronic components of the HMD 300.

The HMD 300 has a distributed design in which each of the plurality of RF antennas 304A, 304B, 304C, 304D, 304E, 304F, 304G is electrically connected to a corresponding RF transceiver of a plurality of RF transceivers 308A, 308B, 308C, 308D, 308E, 308F, 308G. Each RF transceiver is configured to control operation of the corresponding RF antenna. In particular, the RF transceiver is configured to drive the corresponding RF antenna with a drive signal at a frequency within a resonant frequency band of the corresponding RF antenna and sense a frequency response to the drive signal.

Further, each of a plurality of notch filter circuits 310A, 310B, 310C, 310D, 310E, 310F, 310G, 310H is electrically connected in series with a corresponding RF antenna of the plurality of RF antennas 304A, 304B, 304C, 304D, 304E, 304F, 304G. Each RF antenna is electrically isolated from other RF antennas in a resonant frequency band of the RF antenna by the electrically connected notch filter circuit. In particular, the notch filter circuit is configured to attenuate signals at frequencies within the resonant frequency band of the corresponding RF antenna and pass signals at frequencies outside of the resonant frequency band with little or no attenuation. Such electrical isolation in the resonant frequency band allows the RF antenna to operate with reduced signal interference (e.g., negligible or no interference) from the other RF antennas and other electronic components of the HMD. Further, signals at frequencies outside of the resonant frequency band are allowed to pass through the notch filter. For example, various signals that are outside of the resonant frequency band that are passed through the notch filter circuits include, but are not limited to, cellular signals, WiFi® signals, and signals transmitted by other electronic components of the HMD, such as control signals transmitted from a controller to various electronic components (e.g., display, microphone, camera) of the HMD. In this way, the RF antennas have low impedance connectivity at frequencies outside the resonant frequency band that allows for the segmented metal chassis to function as a common ground plane.

The plurality of RF antennas of the segmented metal chassis collectively functioning as a common ground plane provides various benefits. As one example, the segmented metal chassis provides electrical continuity so that built-up charge can have a common return path through the segmented metal chassis to a ground reference. Such grounding prevents degradation of electronic components of the HMD due to overvoltage and increases ESD robustness of the HMD. As another example, the segmented metal chassis has conductive properties that cause waves radiated by different RF antennas to be reflected thereby increasing radiation performance (e.g., increasing SNR) relative to other HMD configurations.

Figure 4:
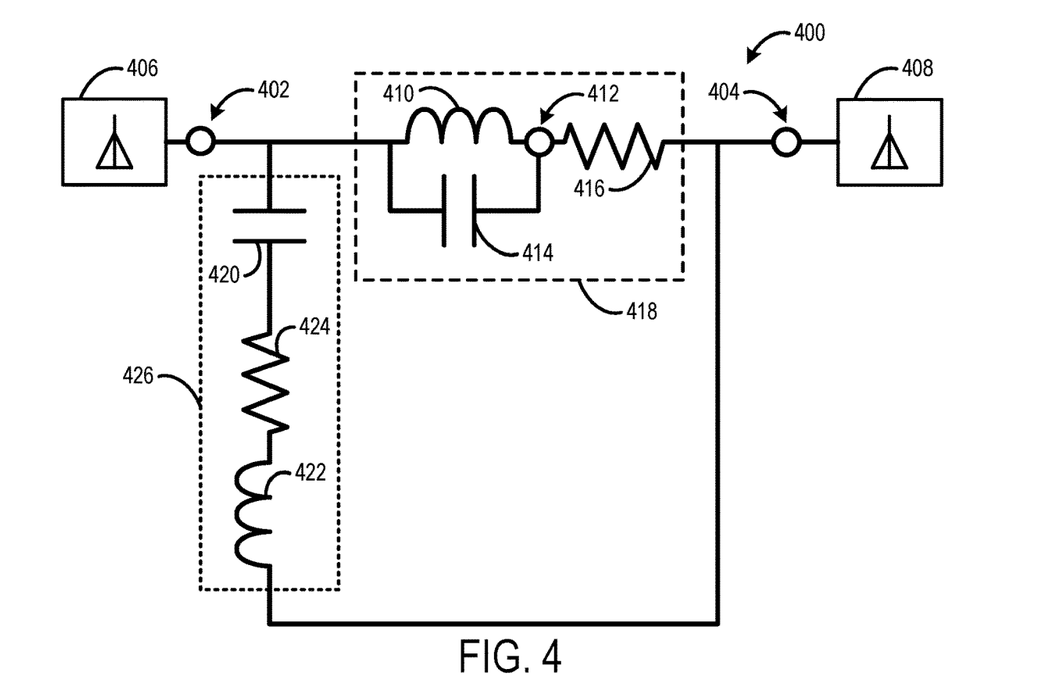
FIG. 4 shows an example notch filter circuit.

FIG. 4 shows an example notch filter circuit 400. For example, the notch filter circuit 400 may correspond to the notch filter circuits 310A, 310B, 310C, 310D, 310E, 310F, 310G, 310H shown in FIG. 3. In the illustrated example, the notch filter circuit 400 is a parallel inductor-capacitor circuit. In other examples, the notch filter may have a different circuit topology. The notch filter circuit 400 includes an input node 402 and an output node 404. The input node 402 is electrically connected to a first RF antenna 406. The output node 404 is electrically connected to a second RF antenna 408. Alternatively or additionally, in some examples, the input and output nodes 406, 408 may be electrically connected to other electronic components and/or a ground reference. A first inductor 410 is electrically connected between the input node 402 and an intermediate node 412, a first capacitor 414 is electrically connected in parallel with the first inductor 412 between the input node 402 and the intermediate node 412. A first resistor 416 is electrically connected between the intermediate node 412 and the output node 404. Further, a second capacitor 420 is electrically connected to the input node 402. A second inductor 422 is electrically connected to the output node 404. A second resister 424 is electrically connected in series between the second capacitor 420 and the second inductor 422.

In the illustrated example, a first sub-circuit 418 including the first inductor 410, the first capacitor 414, and the first resistor 418 may replicate the function of the inductor in the parallel inductor-capacitor circuit. Further, a second sub-circuit 426 including the second capacitor 420, the second inductor 422, and the second resistor 424 may replicate the function of the capacitor in the parallel inductor-capacitor circuit.

In some implementations, an inductance of an inductor of the parallel inductor-capacitor circuit and a capacitance of a capacitor of the parallel inductor-capacitor circuit 400 are selected based on binning for tolerance. For example, a capacitor having a lower capacitance may be paired with an inductor having a higher inductance, a capacitor having a medium capacitance may be paired with an inductor having a medium inductance, and a capacitor having a higher capacitance may be paired with an inductor having a lower inductance. Such binning and pairing of electronic components may allow for use of electronic components having greater manufacturing tolerances and lower cost without a reduction in performance.

In some implementations, an inductance of an inductor of the parallel inductor-capacitor circuit and a capacitance of a capacitor of the parallel inductor-capacitor circuit 400 are selected such that the resonant frequency band of each notch filter circuit 400 is within an ISM radio band (e.g., 6.78 MHz with 30 kHz of BW). The electronic components of the notch filter circuit 400 may be selected to have any suitable properties/parameter values to abide by the design requirements of the corresponding RF antenna and more generally the design requirements of the HMD.

Figure 5:
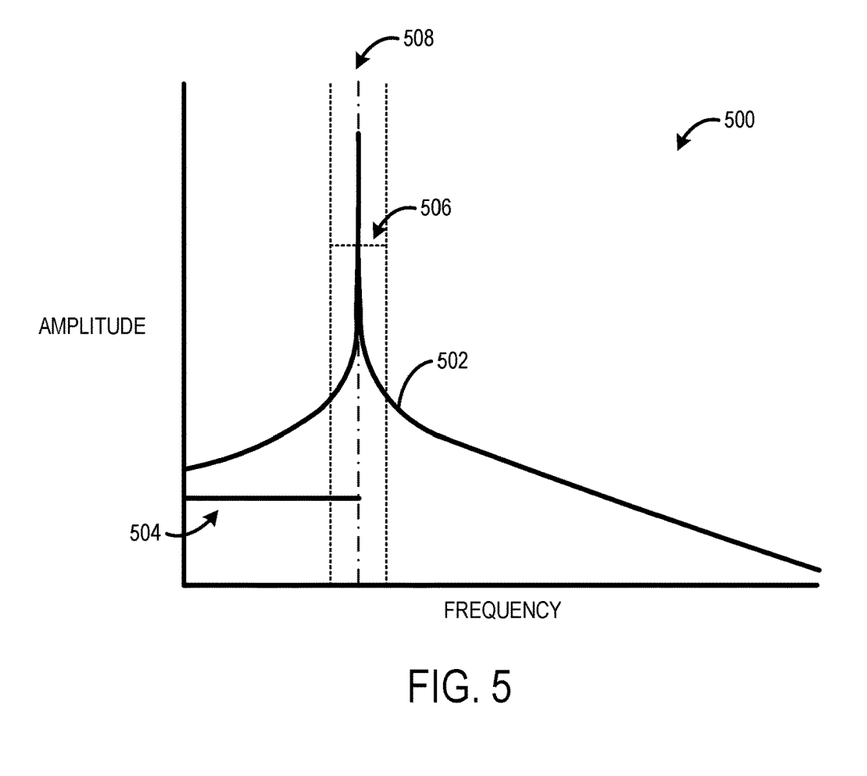
FIG. 5 shows a graph of an example frequency response of the example notch filter circuit of FIG. 4.

FIG. 5 shows a graph 500 of an example frequency response 502 of the notch filter circuit 400 of FIG. 4. The graph 500 indicates an impedance of the frequency response 502 and a corresponding phase 504. The notch filter 400 is configured to attenuate signals at frequencies within a resonant frequency band 506 for a resonant frequency 508 of an RF antenna that corresponds to the notch filter 400. For example, the signals used for face tracking may reside in the resonant frequency band 506. The impedance of such signals in the resonant frequency band 506 may be suitably high enough to imitate an open circuit between RF antennas that allows for each RF antenna to be electrically isolated.

Such electrical isolation in the resonant frequency band allows the RF antenna to operate with reduced signal interference (e.g., negligible or no interference) from the other RF antennas as well as other electronic components of the HMD. Additionally, such electrical isolation allows multiple RF antennas to be driven/sensed at the same time without one RF antenna interfering with another. Moreover, such capability to operate multiple RF antennas simultaneously alleviates the need for multiplexed control and allows for the omission of active switches. In this way, power consumption and cost of the HMD may be reduced relative to configurations that employ multiplexers.

Furthermore, the notch filter 400 is configured to pass signals at frequencies outside of the resonant frequency band 506 (e.g., cellular, BTLE®, WiFi® signals and other signals of electronic components of the HMD) with negligible attenuation. Such frequency-band-specific filtering provided by the notch filter circuits allows for the RF antennas to have low impedance connectivity at frequencies outside the resonant frequency band, such that the RF antennas of the segmented metal chassis function as a common ground plane. The common ground plane provides electrical continuity so that built-up charge can have a common return path through the segmented metal chassis to a ground reference, which prevents overvoltage and increases ESD robustness of the HMD. Further, the common ground plane has conductive properties that cause waves radiated by different RF antennas to be reflected thereby increasing radiation performance (e.g., increasing SNR) relative to other HMD configurations.

Returning to FIG. 3, in the illustrated example, a jaw RF transceiver 308A is electrically connected to a jaw RF antenna 304A corresponding to a jaw head region. The jaw RF transceiver 308A is configured to drive the jaw RF antenna 304A with a drive signal at a frequency within a resonant frequency band of the jaw RF antenna 304A and sense a frequency response to the drive signal. A notch filter circuit 310A is electrically connected between the jaw RF antenna 304A and the ground reference 306 to electrically isolate the jaw RF antenna 304A in the resonant frequency band of the jaw RF antenna 304. A notch filter circuit 310B is electrically connected between the jaw RF antenna 304A and a left temple RF antenna 304B to electrically isolate the jaw RF antenna 304A in the resonant frequency band of the jaw RF antenna 304A.

A left temple RF transceiver 308B is electrically connected to the left temple RF antenna 304B corresponding to a left temple head region. The left temple RF transceiver 308B is configured to drive the left temple RF antenna 304B with a drive signal at a frequency within a resonant frequency band of the left temple RF antenna 304B and sense a frequency response to the drive signal. A notch filter circuit 310C is electrically connected between the left temple RF antenna 304B and a left check RF antenna 304C to electrically isolate the left temple RF antenna 304B in the resonant frequency band of the left temple RF antenna 304B.

A left cheek RF transceiver 308C is electrically connected to the left cheek RF antenna 304C corresponding to a left cheek head region. The left cheek RF transceiver 308C is configured to drive the left cheek RF antenna 304C with a drive signal at a frequency within a resonant frequency band of the left cheek RF antenna 304C and sense a frequency response to the drive signal. A notch filter circuit 310D is electrically connected between the left cheek RF antenna 304C and a nose RF antenna 304D to electrically isolate the left cheek RF antenna 304C in the resonant frequency band of the left cheek RF antenna 304C.

A nose RF transceiver 308D is electrically connected to the nose RF antenna 304D corresponding to a nose head region. The nose RF transceiver 308D is configured to drive the nose RF antenna 304D with a drive signal at a frequency within a resonant frequency band of the nose RF antenna 304D and sense a frequency response to the drive signal. A notch filter circuit 310E is electrically connected between the nose RF antenna 304D and an eyebrow RF antenna 304E to electrically isolate the nose RF antenna 304D in the resonant frequency band of the nose RF antenna 304D.

An eyebrow RF transceiver 308E is electrically connected to the eyebrow RF antenna 304E corresponding to an eyebrow head region. The eyebrow RF transceiver 308E is configured to drive the eyebrow RF antenna 304E with a drive signal at a frequency within a resonant frequency band of the eyebrow RF antenna 304E and sense a frequency response to the drive signal. A notch filter circuit 310F is electrically connected between the eyebrow RF antenna 304E and a right cheek RF antenna 304F to electrically isolate the eyebrow RF antenna 304E in the resonant frequency band of the eyebrow RF antenna 304E.

A right cheek RF transceiver 308F is electrically connected to the right cheek RF antenna 304F corresponding to a right cheek head region. The right cheek RF transceiver 308F is configured to drive the right cheek RF antenna 304F with a drive signal at a frequency within a resonant frequency band of the right cheek RF antenna 304F and sense a frequency response to the drive signal. A notch filter circuit 310G is electrically connected between the right cheek RF antenna 304F and a right temple RF antenna 304G to electrically isolate the right cheek RF antenna 304F in the resonant frequency band of the right cheek RF antenna 304F.

A right temple RF transceiver 308G is electrically connected to the right temple RF antenna 304G corresponding to a right temple head region. The right temple RF transceiver 308G is configured to drive the right temple RF antenna 304G with a drive signal at a frequency within a resonant frequency band of the right temple RF antenna 304G and sense a frequency response to the drive signal. A notch filter circuit 310H is electrically connected between the right temple RF antenna 304G and a controller 312 to electrically isolate the right temple RF antenna 304G in the resonant frequency band of the right temple RF antenna 304G. The controller 312 is electrically connected to the ground reference 306. The controller 312 is configured to perform facial expression tracking and other related computing operations based on sensed frequency responses received from the plurality of RF antennas 304A, 304B, 304C, 304D, 304E, 304F, 304G as will be discussed in further detail with reference to FIG. 6. The controller 312 is configured to communicate with components of the HMD 300 using control signals having frequencies outside of the resonant frequency bands of the RF antennas, so that the control signals may be passed through the notch filter circuits 310A-G without being attenuated. Likewise, the controller 312 may receive signals (e.g., signals indicating sensed frequency responses from the RF transceivers) that having frequencies outside of the resonant frequency bands of the RF antennas, so that the signals may be passed through the notch filter circuits 310A-G without being attenuated.

The distributed design of the HMD 300 including the segmented metal chassis 302 allows for the omission of active switches and an active shield. By omitting the active switches and the active shield from the HMD 300, the HMD 300 has increased power efficiency, reduced cost, reduced weight, and improved industrial design relative to an HMD that employs a multi-band antenna configuration that is controlled by a centralized radio transceiver.

Furthermore, by functioning as a common ground plane, the segmented metal chassis provides various benefits. As one example, the segmented metal chassis provides electrical continuity so that built-up charge can have a common return path through the segmented metal chassis to the ground reference. Such grounding prevents degradation of electronic components of the HMD due to overvoltage and increases electro-static discharge (ESD) robustness of the HMD. As another example, the segmented metal chassis has conductive properties that cause waves radiated by the different RF antennas to be reflected thereby increasing radiation performance of the RF antennas relative to other configurations.

Figure 6:
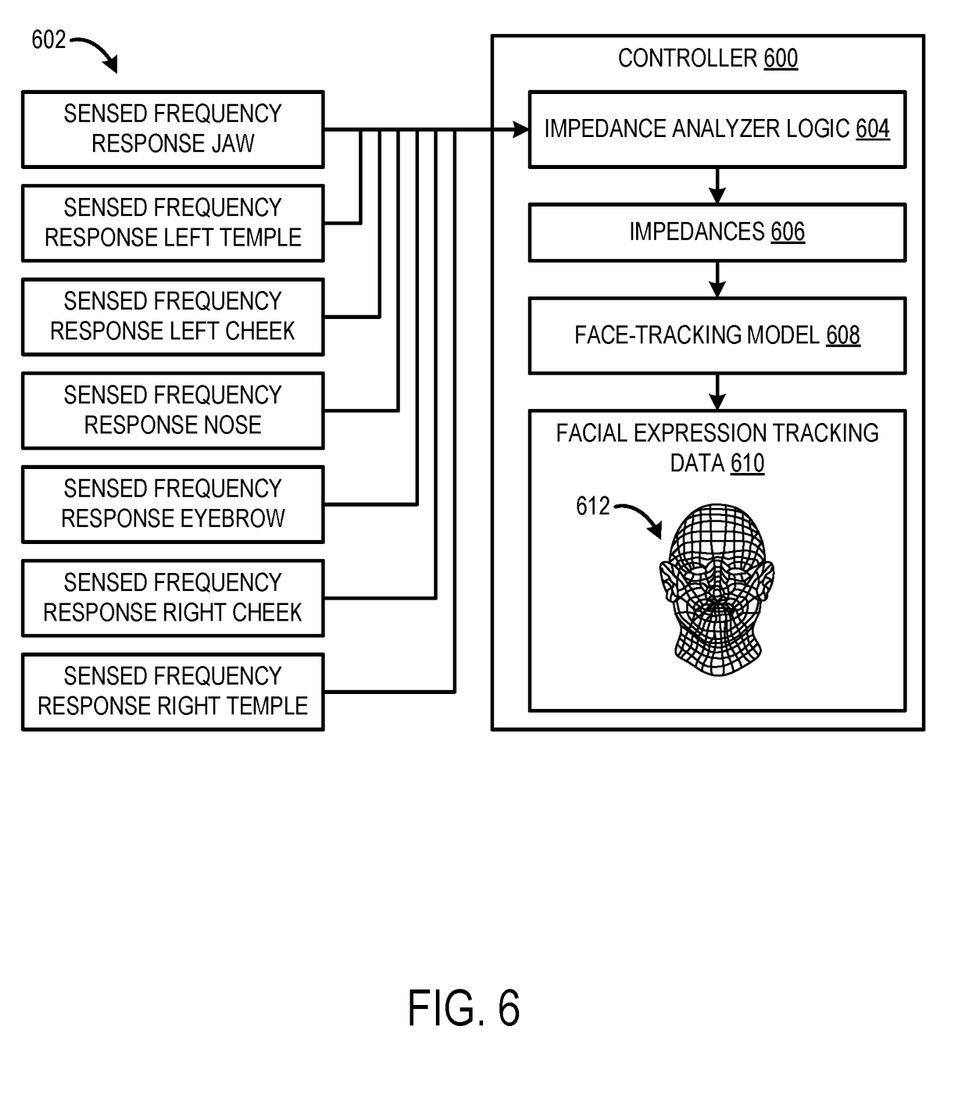
FIG. 6 shows an example controller of an HMD.

FIG. 6 shows an example controller 600 of an HMD. For example, the controller 600 may correspond to the controller 312 of the HMD 300 shown in FIG. 3. The controller 600 is configured to receive a plurality of sensed frequency responses 602 output from the plurality of RF antennas corresponding to the different head regions (e.g., jaw, left temple, left cheek, nose, eyebrow, right cheek, right temple). In some examples, the sensed frequency responses may include voltages sensed on the RF antenna by the corresponding RF transceiver.

The controller 600 includes impedance analyzer logic 604 that is configured to determine a plurality of impedances 606 based at least on the plurality of sensed frequency responses 602 corresponding to the plurality of RF antennas. The controller 600 may receive signals indicating the sensed frequency responses 602 from the plurality of RF transceivers 308A-308G shown in FIG. 3. Such signals have frequencies that are outside of the resonant frequency bands of the notch filter circuits 310A-310H, such that the signals may be passed through the notch filter circuits to the controller 600. In some examples, the impedance analyzer logic 604 employs a look up-table that maps a sensed frequency response (e.g., a voltage) to an impedance. The impedance analyzer logic 604 may determine the plurality of impedances 606 in any suitable manner based at least on the sensed frequency responses 602. The impedance analyzer logic 604 is further configured to associate each determined impedance 606 with a head region of the plurality of head regions. The impedance analyzer logic 604 may be implemented using any suitable configuration of hardware/software/firmware components. The impedances associated with the different head regions provide a continuous signal that informs the state of the head regions. For example, impedance may indicate distance/proximity, touch, pressure/force of a head region relative to the RF antenna corresponding to the head region.

The controller includes a face-tracking model 608 that is configured to receive as input the plurality of impedances 606 associated with the plurality of head regions. The face-tracking model 608 is configured to generate facial expression tracking data 608 based at least on the plurality of impedances 606 associated with the plurality of head regions.

The face-tracking model 608 may take any suitable form. In some examples, the face-tracking model 608 is a previously-trained neural network. The face-tracking model 608 may be implemented using any suitable configuration of hardware/software/firmware components.

In some examples, the facial expression tracking data 608 indicates a state and/or position of different regions of a user's face and/or head. As one example, the facial expression tracking data 608 may indicate whether a user's mouth is open, closed, smiling, or frowning. As another example, the facial expression tracking data 608 may indicate whether a user's eyes are open wide, relaxed, or closed.

The facial expression tracking data 608 may take any suitable form and/or may be organized according to any suitable data structure. In some examples, the controller 600 may be configured to generate a virtual head model 612 that simulates a facial expression of a user of the HMD based at least on the facial expression tracking data 608.

In some implementations, the controller 600 may be configured to perform various computing operations based at least on the impedances 606 associated with the head regions. In one example, the controller 600 is configured to recognize a touch gesture based on one or more impedances of the plurality of impedances 606. For example, the controller 600 may be configured to recognize a finger touch proximate to the RF antennas corresponding to the temples or the jaw. Further, the controller 600 may perform a computing operation based at least on the recognized touch gesture. As one example, the controller 600 may adjust a display state of the HMD based at least on recognizing the touch gesture. As another example, the controller 600 may adjust a speaker volume of the HMD based at least on recognizing the touch gesture. As yet another example, the controller 600 may prompt a virtual assistant to ask a question based at least on recognizing the touch gesture. The controller 600 may be configured to perform any suitable computing operation based at least on recognizing the touch gesture.

In another example, the controller 600 may be configured to recognize that the HMD is placed on a user's head based at least on based on one or more impedances of the plurality of impedances 606. In one example, the controller 600 may be configured to recognize that the user is wearing the HMD based at least on impedances associated with the nose and the temple head regions, and automatically turn on the display of the HMD based on the HMD being placed on a user's head. Further, the controller 600 may be configured to recognize that the user takes off the HMD based at least on the plurality of impedances and automatically turn off the display of the HMD. The controller 600 may be configured to perform any suitable computing operation based at least on recognizing that the user puts on or takes off the HMD.

In some implementations, the controller 600 may be configured to perform various computing operations based at least on the facial expression tracking data 608. In one example, the controller 600 may be configured to recognize that the user is squinting based on the facial expression tracking data 608 and automatically adjust the brightness of a display of the HMD to reduce eye strain. In another example, the controller 600 may be configured to recognize that the user is yawning based on the facial expression tracking data 608 and prompt a virtual assistant to suggest going to sleep or providing some other recommendation. The controller 600 may be configured to perform any suitable computing operation based at least on the facial expression tracking data 608.

Figure 7:
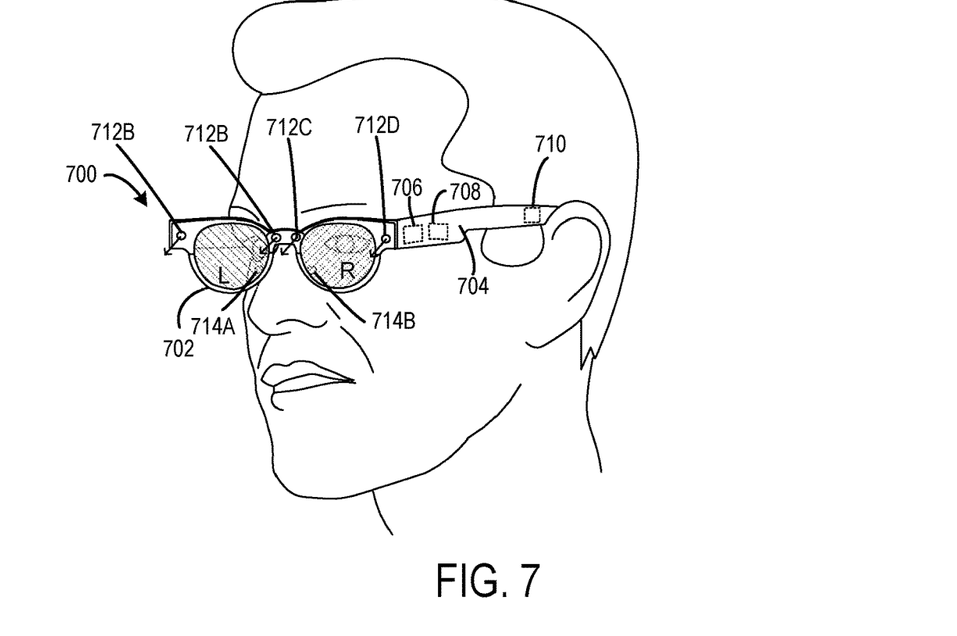
FIG. 7 shows an example HMD.

As noted above, aspects of the present disclosure may be practiced by an HMD. The HMD may take a variety of forms. FIG. 7 shows an example HMD 700 including a near-eye display 702. In some implementations, the HMD 700 may take the form of a virtual reality display device that includes an opaque, non-see-through near-eye display. In other implementations, the HMD 700 may take the form of an augmented reality display device that comprises an at least partially transparent near-eye display that is configured to enable a wearer of the HMD to view physical, real-world objects in a physical space through one or more partially transparent pixels displaying virtual object representations. It will be appreciated that the following descriptions of sensors and systems may apply to both the virtual reality HMD and the augmented reality HMD.

The HMD 700 comprises a metal chassis 704 that wraps around at least a portion of a head of a user to position the display 702 near the user's eyes. For example, the metal chassis 704 may correspond to the segmented metal chassis 102 shown in FIGS. 1-2. The metal chassis 704 may support additional components such as, for example, a processor 706 and associated computer memory 708. The processor and associated computer memory 708 may be configured to provide images to the display 702, to receive sensory signals from input devices, and to enact various control processes described herein. In some implementations, the processor 706 and associated computer memory 708 may be implemented as a controller, such as the controller 600 shown in FIG. 6.

The processor 706 may include a logic processor and volatile memory and non-volatile storage, as discussed in more detail below with respect to the example computing system 800 of FIG. 8.

With continued reference to FIG. 7, various suitable display technologies and configurations may be used to display images via the displays of the HMD 700. In the example of an augmented reality HMD, the display 702 may comprise image-producing elements such as, for example, a liquid crystal on silicon (LCOS) micro display or scanned beam projector, and a see-through waveguide-based or prism-based combiner to deliver virtual images to the user for viewing in combination with the real-world background. Virtual reality displays may utilize similar image-producing elements, but may comprise an opaque enclosure, rather than a transparent combiner.

The display 702 may include both a left L and right R display in a stereoscopic display configuration. The left L and right R displays each display a view of an augmented reality scene from the perspective of the user's corresponding eye. By viewing the augmented reality scene through the left L and right R displays, the user will perceive virtual objects as being located at particular depths in the real world.

The HMD 700 may include various sensors and related systems to provide information to the processor 706. Such sensors may include an inertial measurement unit (IMU) 710, outward facing cameras 712A, 712B, 712C, 712D, and inward facing cameras 714A, 714B. In some examples, one or more of the outward facing cameras may include visible light cameras. In some examples, one or more of the outward facing cameras may include depth cameras. The position and/or orientation of the HMD 700 may be assessed relative to the physical environment. In different examples, signals from the IMU 710, and one or more outward facing cameras 712 may be utilized to provide position and/or orientation data to the processor 706. The outward facing cameras 712 may be configured to capture and/or measure physical attributes of the physical space in which the HMD 700 resides. Additionally, such image data and/or depth data may be used to recognize gestures and/or generate a three-dimensional body simulation of the user. The inward facing camera be configured to capture images of the user's eye for gaze tracking and/or facial expression tracking. Further, the HMD 700 may include a plurality of RF antennas distributed through the metal chassis 714 to provide facial expression and/or head tracking functionality.

In some implementations, the methods and processes described herein may be tied to a computing system including one or more computing devices. In particular, such methods and processes may be implemented as a computer-application program or service, an application-programming interface (API), a library, and/or other computer-program product.

Figure 8:
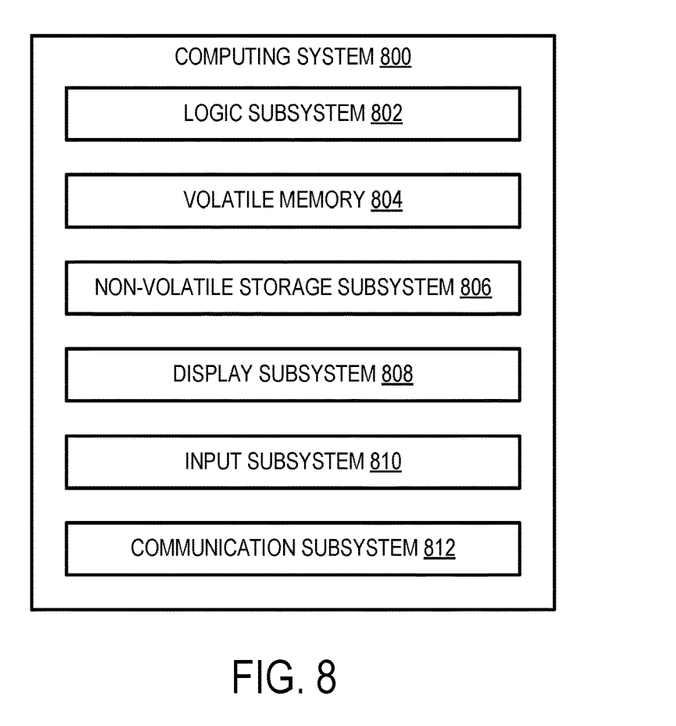
FIG. 8 shows an example computing system.

FIG. 8 schematically shows a non-limiting implementation of a computing system 800 that can enact one or more of the methods and processes described above. Computing system 800 is shown in simplified form. For example, the computing system 800 may embody any of the remote computing system 200, the first head-mounted display device 202, the HMD 100 shown in FIGS. 1-2, the HMD 300 shown in FIG. 3, and the HMD 700 shown in FIG. 7. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 800 includes a logic subsystem 802 volatile memory 804, and a non-volatile storage subsystem 806. Computing system 800 may optionally include a display subsystem 808, input subsystem 810, communication subsystem 812, and/or other components not shown in FIG. 8.

Logic subsystem 802 includes one or more physical devices configured to execute instructions. For example, the logic subsystem may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 802 may include one or more physical processors (hardware) configured to execute software instructions. Additionally or alternatively, the logic subsystem 802 may include one or more hardware logic circuits or firmware devices configured to execute hardware-implemented logic or firmware instructions. Processors of the logic subsystem 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic subsystem 802 may be virtualized and executed by remotely accessible, networked computing devices configured in a cloud-computing configuration. In such a case, these virtualized aspects are run on different physical logic processors of various different machines, it will be understood.

Volatile memory 804 may include physical devices that include random access memory. Volatile memory 804 is typically utilized by logic subsystem 802 to temporarily store information during processing of software instructions. It will be appreciated that volatile memory 804 typically does not continue to store instructions when power is cut to the volatile memory 804.

Non-volatile storage subsystem 806 includes one or more physical devices configured to hold instructions executable by the logic subsystem to implement the methods and processes described herein. When such methods and processes are implemented, the state of non-volatile storage subsystem 806 may be transformed—e.g., to hold different data.

Non-volatile storage subsystem 806 may include physical devices that are removable and/or built in. Non-volatile storage subsystem 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage subsystem 806 may include nonvolatile, dynamic, static, read/write, read-only, sequential-access, location-addressable, file-addressable, and/or content-addressable devices. It will be appreciated that non-volatile storage subsystem 806 is configured to hold instructions even when power is cut to the non-volatile storage subsystem 806.

Aspects of logic subsystem 802, volatile memory 804, and non-volatile storage subsystem 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic subsystem 802, volatile memory 804, and/or non-volatile storage subsystem 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 800 to send and/or receive messages to and/or from other devices via a network such as the Internet.

In an example, a head-mounted device comprises a segmented metal chassis including a plurality of physically separate radio frequency (RF) antennas corresponding to a plurality of head regions, a plurality of RF transceivers, each RF transceiver being electrically connected to a corresponding RF antenna of the plurality of RF antennas and configured to drive the corresponding RF antenna with a drive signal at a frequency within a resonant frequency band of the corresponding RF antenna and sense a frequency response to the drive signal, and a plurality of notch filter circuits, each notch filter circuit being electrically connected in series with a corresponding RF antenna of the plurality of RF antennas, and each notch filter configured to attenuate signals at frequencies within the resonant frequency band of the corresponding RF antenna and pass signals at frequencies outside of the resonant frequency band, such that the segmented metal chassis functions as a common ground plane. In this example and/or other examples, the head-mounted device may further comprise a controller electrically connected to the segmented metal chassis and configured to receive a plurality of sensed frequency responses corresponding to the plurality of RF antennas, determine a plurality of impedances based at least on the plurality of sensed frequency responses corresponding to the plurality of RF antennas, and associate each impedance of the plurality of impedances with a head region of the plurality of head regions. In this example and/or other examples, the controller may be configured to generate, via a face-tracking model, facial expression tracking data based at least on the plurality of impedances associated with the plurality of head regions. In this example and/or other examples, the face-tracking model may be a previously-trained neural network. In this example and/or other examples, the controller may be configured to recognize a touch gesture based on one or more impedances of the plurality of impedances, and perform a computing operation based at least on the recognized touch gesture. In this example and/or other examples, the controller may be configured to recognize that the head-mounted device is placed on a user's head based at least on based on one or more impedances of the plurality of impedances, and perform a computing operation based at least on recognizing that the head-mounted device is placed on the user's head. In this example and/or other examples, each notch filter circuit of the plurality of notch filter circuits may be a parallel inductor-capacitor circuit. In this example and/or other examples, the parallel inductor-capacitor circuit may include an input node and an output node, a first inductor electrically connected between the input node and an intermediate node, a first capacitor electrically connected in parallel with the first inductor between the input node and the intermediate node, a first resistor electrically connected between the intermediate node and the output node, a second capacitor electrically connected to the input node, a second inductor electrically connected to the output node, and a second resister electrically connected in series between the second capacitor and the second inductor. In this example and/or other examples, an inductance of an inductor of the parallel inductor-capacitor circuit and a capacitance of a capacitor of the parallel inductor-capacitor circuit may be selected such that the resonant frequency band of each notch filter circuit is within an ISM radio band. In this example and/or other examples, the plurality of RF antennas may include one or more of an eyebrow RF antenna corresponding to an eyebrow head region, a right cheek RF antenna corresponding to a right cheek head region, a left cheek RF antenna corresponding to a left cheek head region, a nose RF antenna corresponding to a nose head region, a right temple RF antenna corresponding to a right temple head region, a left temple RF antenna corresponding to a left temple head region, and a jaw RF antenna corresponding to a jaw head region.

In another example, a head-mounted device comprises a segmented metal chassis including a plurality of physically separate radio frequency (RF) antennas corresponding to a plurality of head regions, a plurality of RF transceivers, each RF transceiver being electrically connected to a corresponding RF antenna of the plurality of RF antennas and configured to drive the corresponding RF antenna with a drive signal at a frequency within a resonant frequency band of the corresponding RF antenna and sense a frequency response to the drive signal, a plurality of notch filter circuits, each notch filter circuit being electrically connected in series with a corresponding RF antenna of the plurality of RF antennas, and each notch filter configured to attenuate signals at frequencies within the resonant frequency band of the corresponding RF antenna and pass signals at frequencies outside of the resonant frequency band, such that the segmented metal chassis functions as a common ground plane, and a controller electrically connected to the segmented metal chassis and configured to receive a plurality of sensed frequency responses corresponding to the plurality of RF antennas, determine a plurality of impedances based at least on the plurality of sensed frequency responses corresponding to the plurality of RF antennas, and associate each impedance of the plurality of impedances with a head region of the plurality of head regions. In this example and/or other examples, the controller may be configured to generate, via a face-tracking model, facial expression tracking data based at least on the plurality of impedances associated with the plurality of head regions. In this example and/or other examples, the face-tracking model may be a previously-trained neural network. In this example and/or other examples, the controller may be configured to recognize a touch gesture based on one or more impedances of the plurality of impedances, and perform a computing operation based at least on the recognized touch gesture. In this example and/or other examples, the controller may be configured to recognize that the head-mounted device is placed on a user's head based at least on based on one or more impedances of the plurality of impedances, and perform a computing operation based at least on recognizing that the head-mounted device is placed on the user's head. In this example and/or other examples, each notch filter circuit of the plurality of notch filter circuits may be a parallel inductor-capacitor circuit. In this example and/or other examples, the parallel inductor-capacitor circuit may include an input node and an output node, a first inductor electrically connected between the input node and an intermediate node, a first capacitor electrically connected in parallel with the first inductor between the input node and the intermediate node, a first resistor electrically connected between the intermediate node and the output node, a second capacitor electrically connected to the input node, a second inductor electrically connected to the output node, and a second resister electrically connected in series between the second capacitor and the second inductor. In this example and/or other examples, an inductance of an inductor of the parallel inductor-capacitor circuit and a capacitance of a capacitor of the parallel inductor-capacitor circuit may be selected such that the resonant frequency band of each notch filter circuit is within an ISM radio band. In this example and/or other examples, the plurality of RF antennas may include one or more of an eyebrow RF antenna corresponding to an eyebrow head region, a right cheek RF antenna corresponding to a right cheek head region, a left cheek RF antenna corresponding to a left cheek head region, a nose RF antenna corresponding to a nose head region, a right temple RF antenna corresponding to a right temple head region, a left temple RF antenna corresponding to a left temple head region, and a jaw RF antenna corresponding to a jaw head region.

In yet another example, a head-mounted device comprises a segmented metal chassis including a plurality of physically separate radio frequency (RF) antennas corresponding to a plurality of head regions, the plurality of RF antennas including one or more of an eyebrow RF antenna corresponding to an eyebrow head region, a right cheek RF antenna corresponding to a right cheek head region, a left cheek RF antenna corresponding to a left cheek head region, a nose RF antenna corresponding to a nose head region, a right temple RF antenna corresponding to a right temple head region, a left temple RF antenna corresponding to a left temple head region, and a jaw RF antenna corresponding to a jaw head region, a plurality of RF transceivers, each RF transceiver being electrically connected to a corresponding RF antenna of the plurality of RF antennas and configured to drive the corresponding RF antenna with a drive signal at a frequency within a resonant frequency band of the corresponding RF antenna and sense a frequency response to the drive signal, and a plurality of notch filter circuits, each notch filter circuit being electrically connected in series with a corresponding RF antenna of the plurality of RF antennas, and each notch filter configured to attenuate signals at frequencies within the resonant frequency band of the corresponding RF antenna and pass signals at frequencies outside of the resonant frequency band, such that the segmented metal chassis functions as a common ground plane.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A head-mounted device comprising:
   a segmented metal chassis including a plurality of physically separate radio frequency (RF) antennas corresponding to a plurality of head regions;
   a plurality of RF transceivers, each RF transceiver being electrically connected to a corresponding RF antenna of the plurality of RF antennas and configured to drive the corresponding RF antenna with a drive signal at a frequency within a resonant frequency band of the corresponding RF antenna and sense a frequency response to the drive signal;
   a plurality of notch filter circuits, each notch filter circuit being electrically connected in series with a corresponding RF antenna of the plurality of RF antennas, and each notch filter configured to attenuate signals at frequencies within the resonant frequency band of the corresponding RF antenna and pass signals at frequencies outside of the resonant frequency band, such that the segmented metal chassis functions as a common ground plane; and
   a controller electrically connected to the segmented metal chassis and configured to:
      receive a plurality of sensed frequency responses corresponding to the plurality of RF antennas,
      determine a plurality of impedances based at least on the plurality of sensed frequency responses corresponding to the plurality of RF antennas, associate each impedance of the plurality of impedances with a head region of the plurality of head regions; and
generate, via a face-tracking model, facial expression tracking data based at least on the plurality of impedances associated with the plurality of head regions.

2. The head-mounted device of claim 1, wherein the face-tracking model is a previously-trained neural network.

3. The head-mounted device of claim 1, wherein the controller is configured to:
recognize a touch gesture based on one or more impedances of the plurality of impedances; and
perform a computing operation based at least on the recognized touch gesture.

4. The head-mounted device of claim 1, wherein the controller is configured to:
recognize that the head-mounted device is placed on a user's head based at least on based on one or more impedances of the plurality of impedances; and
perform a computing operation based at least on recognizing that the head-mounted device is placed on the user's head.

5. The head-mounted device of claim 1, wherein each notch filter circuit of the plurality of notch filter circuits is a parallel inductor-capacitor circuit.

6. The head-mounted device of claim 5, wherein the parallel inductor-capacitor circuit includes an input node and an output node, a first inductor electrically connected between the input node and an intermediate node, a first capacitor electrically connected in parallel with the first inductor between the input node and the intermediate node, a first resistor electrically connected between the intermediate node and the output node, a second capacitor electrically connected to the input node, a second inductor electrically connected to the output node, and a second resister electrically connected in series between the second capacitor and the second inductor.

7. The head-mounted device of claim 5, wherein an inductance of an inductor of the parallel inductor-capacitor circuit and a capacitance of a capacitor of the parallel inductor-capacitor circuit are selected such that the resonant frequency band of each notch filter circuit is within an ISM radio band.

8. The head-mounted device of claim 1, wherein the plurality of RF antennas includes one or more of an eyebrow RF antenna corresponding to an eyebrow head region, a right cheek RF antenna corresponding to a right cheek head region, a left cheek RF antenna corresponding to a left cheek head region, a nose RF antenna corresponding to a nose head region, a right temple RF antenna corresponding to a right temple head region, a left temple RF antenna corresponding to a left temple head region, and a jaw RF antenna corresponding to a jaw head region.

9. A head-mounted device comprising:
a segmented metal chassis including a plurality of physically separate radio frequency (RF) antennas corresponding to a plurality of head regions;
a plurality of RF transceivers, each RF transceiver being electrically connected to a corresponding RF antenna of the plurality of RF antennas and configured to drive the corresponding RF antenna with a drive signal at a frequency within a resonant frequency band of the corresponding RF antenna and sense a frequency response to the drive signal;
a plurality of notch filter circuits, each notch filter circuit being electrically connected in series with a corresponding RF antenna of the plurality of RF antennas, and each notch filter configured to attenuate signals at frequencies within the resonant frequency band of the corresponding RF antenna and pass signals at frequencies outside of the resonant frequency band, such that the segmented metal chassis functions as a common ground plane; and
a controller electrically connected to the segmented metal chassis and configured to:
receive a plurality of sensed frequency responses corresponding to the plurality of RF antennas,
determine a plurality of impedances based at least on the plurality of sensed frequency responses corresponding to the plurality of RF antennas, and
associate each impedance of the plurality of impedances with a head region of the plurality of head regions.

10. The head-mounted device of claim 9, wherein the controller is configured to:
generate, via a face-tracking model, facial expression tracking data based at least on the plurality of impedances associated with the plurality of head regions.

11. The head-mounted device of claim 10, wherein the face-tracking model is a previously-trained neural network.

12. The head-mounted device of claim 9, wherein the controller is configured to:
recognize a touch gesture based on one or more impedances of the plurality of impedances; and
perform a computing operation based at least on the recognized touch gesture.

13. The head-mounted device of claim 9, wherein the controller is configured to:
recognize that the head-mounted device is placed on a user's head based at least on based on one or more impedances of the plurality of impedances; and
perform a computing operation based at least on recognizing that the head-mounted device is placed on the user's head.

14. The head-mounted device of claim 9, wherein each notch filter circuit of the plurality of notch filter circuits is a parallel inductor-capacitor circuit.

15. The head-mounted device of claim 14, wherein the parallel inductor-capacitor circuit includes an input node and an output node, a first inductor electrically connected between the input node and an intermediate node, a first capacitor electrically connected in parallel with the first inductor between the input node and the intermediate node, a first resistor electrically connected between the intermediate node and the output node, a second capacitor electrically connected to the input node, a second inductor electrically connected to the output node, and a second resister electrically connected in series between the second capacitor and the second inductor.

16. The head-mounted device of claim 14, wherein an inductance of an inductor of the parallel inductor-capacitor circuit and a capacitance of a capacitor of the parallel inductor-capacitor circuit are selected such that the resonant frequency band of each notch filter circuit is within an ISM radio band.

17. The head-mounted device of claim 9, wherein the plurality of RF antennas includes one or more of an eyebrow RF antenna corresponding to an eyebrow head region, a right cheek RF antenna corresponding to a right cheek head region, a left cheek RF antenna corresponding to a left cheek head region, a nose RF antenna corresponding to a nose head region, a right temple RF antenna corresponding to a right temple head region, a left temple RF antenna corresponding to a left temple head region, and a jaw RF antenna corresponding to a jaw head region.

18. A head-mounted device comprising:
a segmented metal chassis including a plurality of physically separate radio frequency (RF) antennas corresponding to a plurality of head regions, the plurality of RF antennas including one or more of an eyebrow RF antenna corresponding to an eyebrow head region, a right cheek RF antenna corresponding to a right cheek head region, a left cheek RF antenna corresponding to a left cheek head region, a nose RF antenna corresponding to a nose head region, a right temple RF antenna corresponding to a right temple head region, a left temple RF antenna corresponding to a left temple head region, and a jaw RF antenna corresponding to a jaw head region;
a plurality of RF transceivers, each RF transceiver being electrically connected to a corresponding RF antenna of the plurality of RF antennas and configured to drive the corresponding RF antenna with a drive signal at a frequency within a resonant frequency band of the corresponding RF antenna and sense a frequency response to the drive signal; and
a plurality of notch filter circuits, each notch filter circuit being electrically connected in series with a corresponding RF antenna of the plurality of RF antennas, and each notch filter configured to attenuate signals at frequencies within the resonant frequency band of the corresponding RF antenna and pass signals at frequencies outside of the resonant frequency band, such that the segmented metal chassis functions as a common ground plane.

* * * * *